Jan. 24, 1967     R. E. RAYNER ETAL     3,299,655
OIL LUBRICATION SYSTEM FOR REFRIGERATION APPARATUS
Filed June 1, 1965     3 Sheets-Sheet 1

RAYMOND E. RAYNER
WILBUR C. SMITH
*INVENTORS*

BY Daniel N. Bobis
*Atty*

RAYMOND E. RAYNER
WILBUR C. SMITH
INVENTORS

RAYMOND E. RAYNER
WILBUR C. SMITH
INVENTORS

BY Daniel H. Bobis
Atty

United States Patent Office 3,299,655
Patented Jan. 24, 1967

3,299,655
OIL LUBRICATION SYSTEM FOR
REFRIGERATION APPARATUS
Raymond E. Rayner, Colonia, and Wilbur C. Smith, North Caldwell, N.J., assignors to Worthington Corporation, Harrison, N.J., a corporation of Delaware
Filed June 1, 1965, Ser. No. 460,227
11 Claims. (Cl. 62—193)

This invention relates to refrigeration apparatus. More particularly, the invention relates to an oil lubrication system for refrigeration apparatus.

Heretofore, especially on start up, the prior art refrigeration apparatus has had a problem with foaming of the oil in the oil reservoir, which may lead to loss of oil pressure, nuisance shutoffs and operating oil loss. In addition the oil separators used in conjunction with the oil lubrication system in the prior art were required to be positioned at a height sufficient to overcome the pressure drop across the drain line. This height varied dependent on the normal pressure existing in the oil reservoir.

Accordingly, it is an object of the present invention to provide a novel oil lubrication system for refrigeration apparatus which overcomes the prior art difficulties and adverse effects of oil foaming by substantially reducing such oil foaming, and further providing an oil separator for the oil lubrication system which has positive means for returning the collected oil therein; which is simple, reliable and economical; which vents the oil reservoir to the inlet of the compressor at the point of lowest suction pressure; which vents the oil reservoir to the inlet of the compressor at the point of lowest suction pressure so that during normal operation rapid pressure reduction in the oil reservoir is prevented; which vents the oil reservoir or gear casings of the motive means downstream of the inlet guide vanes; which provides return of collected oil in the oil separator by utilization of the differential pressure existing between the oil pump discharge pressure and the oil reservoir pressure as the motivating means for inducing such drainage flow.

Other objects and advantages will be apparent from the following description of several embodiments of the invention and the novel features will be particularly pointed out hereinafter in the claims; reference being had to the accompanying drawings forming a part of this specification wherein like reference characters designate corresponding parts in the several views. Furthermore, the phraseology or terminology employed herein is for purpose of description and not of limitation.

Figure 1:
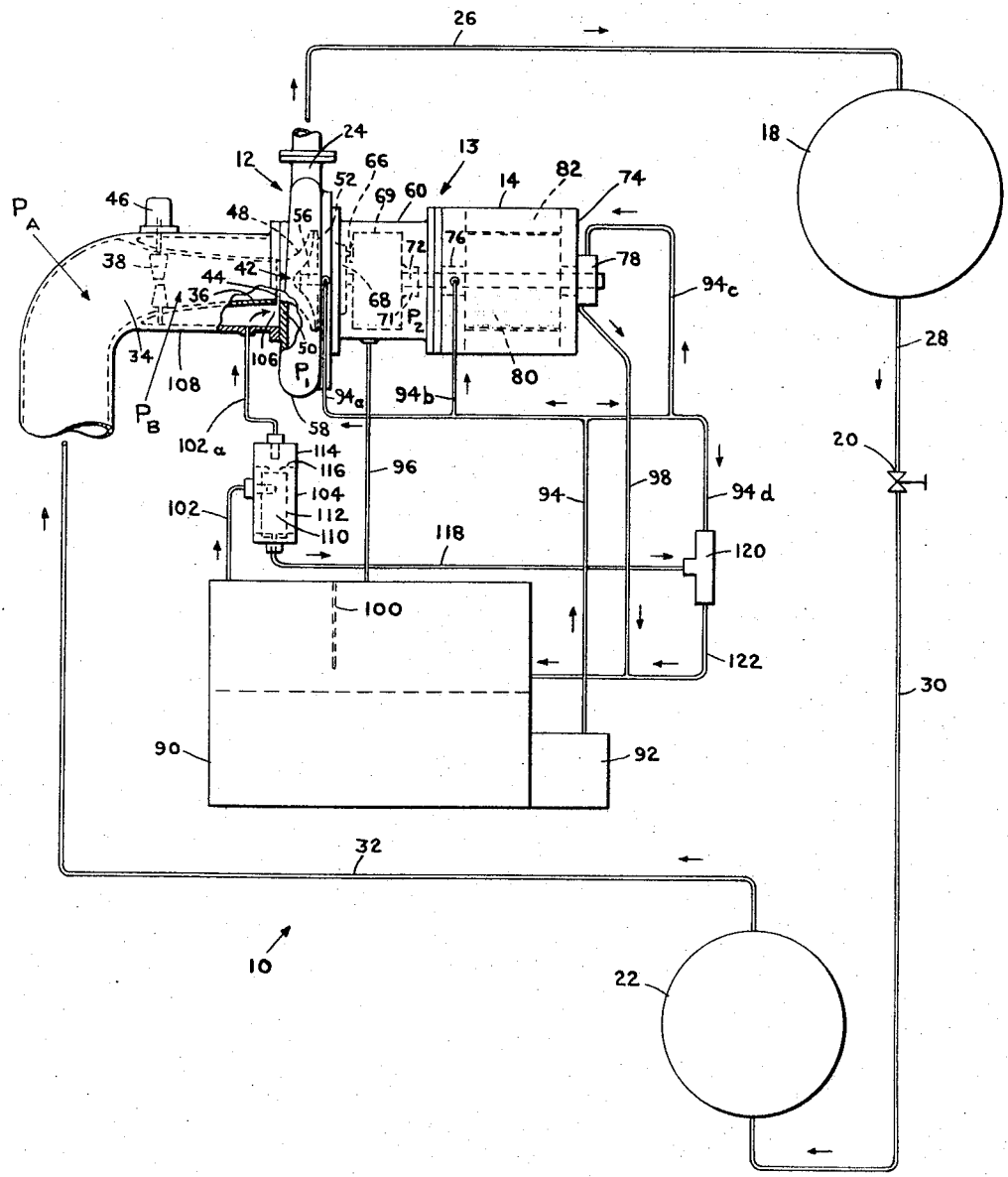
FIGURE 1 is a diagrammatic illustration of refrigeration apparatus in which the novel oil lubrication system is embodied.
Figure 2:
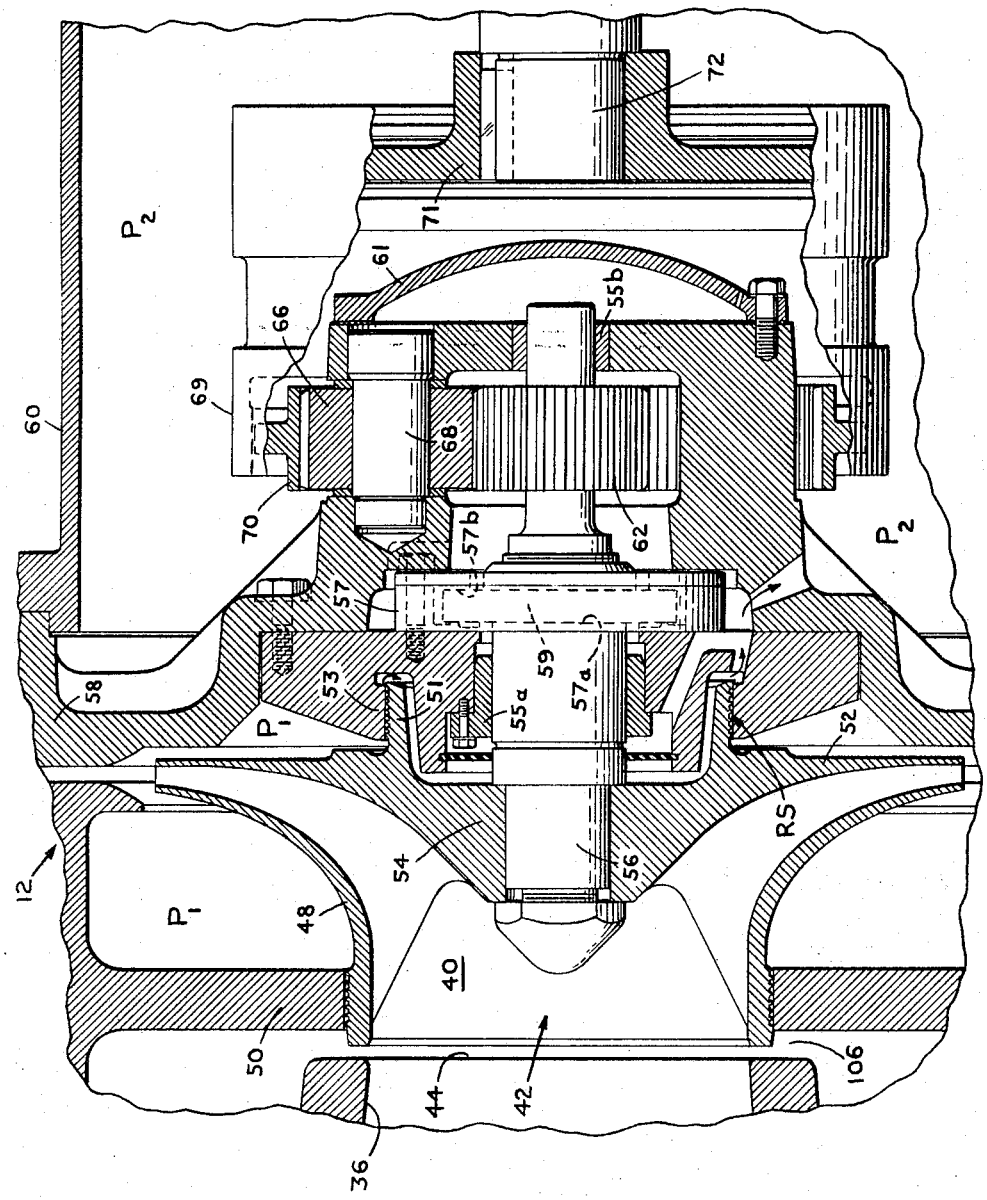
FIGURE 2 is a view of the compressor and gear casing, partly in section, of the present invention.

In the embodiment of the invention shown in FIGURES 1 and 2 the novel oil lubrication system is incorporated in refrigeration apparatus, designated generally as 10.

Refrigeration apparatus 10 as illustrated in FIGURE 1 includes a compressor 12 powered by suitable motive means 13, such as electric motor 14 and speed increasing gear connection 16, condenser 18, any suitable expansion device as for example expansion valve 20, and evaporator 22. The refrigeration loop is formed from outlet 24 of compressor 12 which passes the hot, relatively high pressure, compressed gas through line 26 to condenser 18 wherein it will be condensed prior to passing in line 28 to expansion valve 20. On passing through valve 20 the liquid refrigerant expands to a low pressure and is passed through line 30 to evaporator 22 in which it will be evaporated and passed as a low pressure gas through line 32 to the inlet 34 of compressor 12 from which it enters compressor 12 to once again increase its pressure and temperature to complete the cycle.

Inlet 34 may be of any suitable configuration and may include an inlet nozzle 36 which leads the incoming refrigerant gas through inlet guide vanes 38 and will slope inwardly from a larger dimension to a diameter corresponding to that of the inlet eye 40 of impeller 42. Nozzle 36 extends in direction of impeller eye 40, stopping a short distance therefrom so that a gap 44 is formed therebetween.

Guide vanes 38 may be suitably controlled by automatic control means 46 as is well known in the art. Usually on start up guide vanes 38 will substantially close the inlet passage upstream thereof and thereafter will be opened or regulated responsive to the operative condition of refrigeration apparatus 10 by controller 46. The upstream side of guide vanes 38 are assumed to be at a pressure $P_A$ and the downstream side of guide vanes 38 are assumed to be at a pressure $P_B$. When the guide vanes 38 are closed or partially closed pressure $P_A$ will be greater than pressure $P_B$, which is the case especially during start up of refrigeration apparatus 10.

Eye 40 is formed by front shroud 48 of impeller 42 which sealingly engages annular projection 50 extending from compressor casing 58 to form a front seal.

Impeller 42 as shown in FIGURE 2 has a rear shroud 52 formed with the hub 54 serving to mount impeller 42 on shaft 56. An annular axial projection 51 sealingly engages an oppositely extending projection 53 extending from the casing 58 to form a rear seal RS. Shaft 56 extends from compressor casing 58 into gear casing 60, and has a gear 62 mounted on the end remote from impeller 42. Inwardly of hub 54 a front journal bearing 55a extending from casing 58 supports a portion of shaft 56, while a rear journal bearing 55b extends from casing 58 to also support a portion of shaft 56. Thrust bearing 57 having front and rear faces 57a and 57b extends from casing 58 to engage thrust collar 59 which is suitably mounted to shaft 56. A cover plate 61 extends from casing 58 to protect the end of shaft 56 remote from impeller 42 and the bearings thereof from foreign substances.

A set of gears 66, usually three (one of which is shown) engage opposite side of gear 62 to drive the same. Gears 66 rotate about stationary pins 68 which are suitably connected to casing 58. A ring gear 70 engages gears 66 and transmits rotatable power through coupling 69 which connects to motor hub 71 of shaft 72 of motor 14. Shaft 72 extends from gear casing 60 into motor casing 74 and is suitably supported therein by front bearing 76 and rear bearing 78. Rotor 80 is mounted on shaft 72 and has a stator 82 disposed thereabout in the usual manner. Casings 58, 60 and 74 combine to form a single hermetic casing for compressor 12 and motive means 13, which includes motor 14 and gear connection 16. By means of the gear connection the speed of rotation of the impeller 42 of compressor 12 is greatly increased.

Oil lubrication is supplied to all the bearings from oil reservoir 90 from which oil is drawn by oil pump 92 and discharged in line 94 from which it passes into branches 94a, 94b, and 94c to lubricate the bearings.

Oil from motor bearing 76 and gear casing 60 will collect in gear casing 60 and be returned to oil reservoir 90 by vent and equalization line 96. Oil from rear bearing 78 will be returned to oil reservoir 90 through line 98. A baffle 100 aids in separating the oil and gaseous refrigerant so that the oil will collect in the lower portion of reservoir 90 and the gaseous refrigerant in the upper portion thereof. Pressure equalization lines 102 and 102a are connected through an oil separator 104 for delivering the refrigerant gas into an annular chamber 106 formed between the nozzle 36 and the outer wall 108 of inlet 34. Chamber 106 communicates with gap 44 so that the refrigerant gas from chamber 106 may pass into compressor 12 and further chamber 106 is able to maintain its pressure substantially equal to $P_B$ which is the lowest suction pressure of compressor 12. Oil reservoir 90 which communicates with chamber 106 is at a correspondingly low pressure.

Oil separator 104 is disclosed in detail in the copending application of Melvin A. Ramsey, Ser. No. 369,073, filed May 21, 1964. It consists generally of an inner chamber 110 formed by an annular member 112 disposed in spaced relation to outer wall 114. The flow of gas and oil in line 102 is introduced into chamber 110 wherein the gas will pass upwardly into line 102a and the oil prevented from entering this line by transverse plate 116 extending above the upper end of cylindrical member 112 will collect in the bottom of casing 114 of oil separator 104, and be drawn off in line 118 by a suitable flow inducing means as for example jet pump 120.

Jet pump 120 is connected to discharge branch 94d of oil pump 92 and is operated by the differential pressure existing between the oil pump discharged pressure and the oil reservoir pressure which serves as the motivating means for inducing the drainage flow from oil separator 114. The combined oil flow is discharged from jet pump 120 through line 122 for return to oil reservoir 90.

Assuming the pressure in compressor casing 58 to be $P_1$ and the pressure in gear casing 60 to be $P_2$, it is apparent because of the venting provisions that during operation of the refrigeration apparatus 10 pressure $P_1$ will always be greater than pressure $P_2$. Therefore refrigerant gas behind the rear shroud 52 will leak across labyrinth seal 64 into gear casing 60 from which it will be discharged in vent line 96 into oil reservoir 90 for eventual return to the compressor 12 via line 102. However, especially on startup, pressure $P_A$ may be greater than pressure $P_1$. Though $P_B$ is always less than $P_1$ the condition of $P_A$ being greater than $P_1$ will exist during periods when guide vanes 38 are closed or sufficiently partially closed so that the pressure differential across the guide vanes is greater than the pressure differenial existing between $P_B$ and $P_1$. Thus if during these times the equalization line 102 were at a pressure greater than $P_1$ it would cause short circuiting of the compressor 12, and gas and oil mist would pass through rear seal RS, resulting in oil loss to the refrigerant side of the system. By utilizing pressure $P_B$ the oil reservoir 90 is not subject to a higher pressure than pressure $P_1$ and oil loss is not experienced.

Also when vanes 38 start opening after startup the decrease in pressure $P_A$ is compensated by a decrease in pressure drop $P_A$ minus (—) $P_B$, such that the rate of pressure reduction in the gaseous space above the oil in reservoir 90 is minimum. This results in considerable reduction of the otherwise violent boiling of dissolved refrigerant from the oil. Problems of loss of oil pressure, nuisance shutoffs and oil foaming up through line 102 to separator 104 are greatly reduced.

Figure 3:
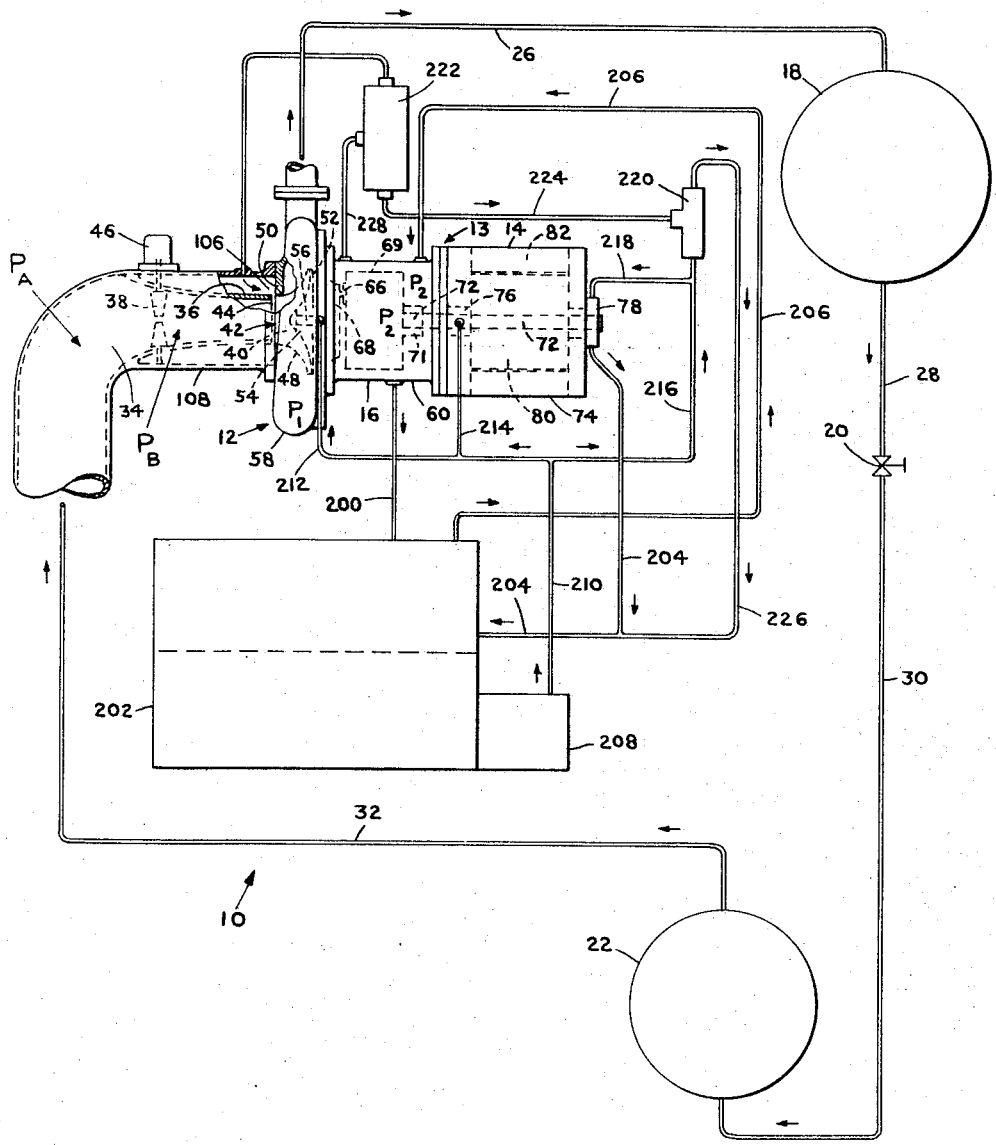
FIGURE 3 is a diagrammatic illustration of a refrigeration apparatus embodying another form of the novel oil lubrication system.

In the embodiment of the invention illustrated in FIGURE 3 another form of the novel oil lubrication system is shown. However, in view of the fact that the refrigeration apparatus is substantially the same as that of FIGURES 1 and 2, the same reference characters for refrigeration apparatus 10 will be used for FIGURE 3 as that used previously. Further, the description and operation of the system will be understood to be the same as that described hereinbefore.

The novel oil lubrication system depicted in FIGURE 3 in its broader aspects is similar to the embodiment shown in FIGURES 1 and 2 except for the addition of equalization lines from the oil reservoir to the gear casing and from the gear casing to communicate with chamber 106. However, this will be more fully understood from the following description.

Oil and a small amount of refrigerant collects at the bottom of gear casing 60 and will pass in line 200 therefrom into oil reservoir 202. Oil is also returned via line 204 from the rear bearing 78 into oil reservoir 202. The oil collects in the lower portion of reservoir 202 and refrigerant gas will collect in the upper portion thereof. The gaseous refrigerant in reservoir 202 will be vented by equalization line 206 into gear casing 60.

Oil in oil reservoir 202 is pumped through oil pump 208 into oil discharge line 210 and therefrom through branch lines 212, 214, 216 and 218 to supply the respective bearings 55a, 55b, 57, 76 and 78.

A portion of the oil in line 216 will feed through jet pump 220 and in similar manner as described hereinbefore under FIGURE 1 the motive oil from line 216 will induce flow of the oil collected in oil separator 222 in line 224. The combined oil in jet pump 220 is discharged therefrom in line 226 which connects into line 204 for return of the oil to oil reservoir 202.

Once again the pressure $P_1$ of compressor casing 58 is always maintained higher than the pressure $P_2$ of the gear casing 60. This insures the flow of the refrigerant gas in compressor 12 to leak through labyrinth rear seal RS into gear casing 60. It is possible to maintain this low pressure $P_2$ in gear casing 60 by venting the casing through lines 228 and 230 to chamber 106, which chamber is in communication with gap 44 which is exposed to pressure $P_B$, the lowest suction pressure in the system. Lines 228 and 230 connect into and extend from, respectively, oil separator 222 which is identical to oil separator 104 described previously.

Accordingly refrigerant gas venting from oil reservoir 202 in line 206 and any refrigerant gas leaking across rear seal RS will be drawn through line 228 into oil separator 222. In the oil separator 222 the oil will be collected and induced therefrom in line 224 to jet pump 220 for return to oil reservoir 202 via lines 226 and 204. The refrigerant gas in oil separator 222 will be drawn through line 230 into chamber 106 and via gap 44 into the suction eye 40 of impeller 42 for processing within refrigeration apparatus 10.

The provision of always connecting the pressure equalization or vent lines to a point in the system which is normally exposed to the lowest pressure, namely pressure $P_B$ makes its possible to substantially reduce oil foaming and nuisance shutoffs in the reservoirs 90 and 202, respectively. Thus even though the pressure $P_A$ upstream of the guide vanes may on occasion be greater than the pressure within compressor 12, namely pressure $P_1$, the pressure gradient of these two points and subsequent rapid reductions in pressure $P_A$ caused by the opening of guide vanes 38 will have little or minimum effect on changing the pressure experienced in oil reservoirs 90 and 202, respectively, since the reservoirs maintain a pressure which corresponds to that of pressure $P_B$, which pressure is downstream of the guide vanes 38 and therefore not subject to the wide range of variations through the opening and closing of such guide vanes as in the pressure $P_A$.

Troublesome oil loss is also eliminated by maintaining pressure $P_1$ at a higher level than pressure $P_2$. In addition the efficiency of the compressor 12 is enhanced by providing positive means to prevent oil in the equalization and venting lines from entering the suction thereof. This is accomplished by employing the positive means of inducing the flow of oil from oil separators 104 and 222, respectively, by means of jet pumps 120 and 220, respectively, which are powered by oil from pumps 92 and 208, respectively. By combining all these advantageous features the present invention is able to obtain the objects above set forth.

It will be understood that various changes in the details, materials, arrangement of part and operating conditions which have been herein described and illustrated in order to explain the nature of the invention may be made by those skilled in the art by the principles and scope of the invention as expressed in the claims.

What is claimed is:

1. An oil lubrication system for refrigeration apparatus which has a centrifugal compressor driven by a motive means, a condenser, an expansion device and an evaporator, connected to each other in an operative refrigeration loop, said system comprising:
   (a) an oil reservoir having a gaseous portion and an oil portion,
   (b) an oil pump in communication with the oil portion of the oil reservoir for delivering oil lubricant to the compressor and motive means,
   (c) pressure equalization line means connected between the oil reservoir, the compressor and the motive means to equalize the pressure in the oil reservoir,
   (d) oil separation means disposed in the pressure equalization line means to collect oil therein and limit the flow of oil from the oil reservoir to the compressor,
   (e) a flow inducing means in communication with the oil separator to induce the flow of collected oil therein for return to the oil reservoir.

2. An oil lubrication system for refrigeration apparatus which has a centrifugal compressor driven by a motive means, condenser, expansion device and evaporator, connected to each other in an operative refrigeration loop, said system comprising:
   (a) an oil reservoir having a gaseous portion and an oil portion,
   (b) an oil pump in communication with the oil portion of the oil reservoir for delivering oil lubrication to the compressor and motive means,
   (c) pressure equalization line means including a first line means connected between the oil reservoir and the compressor adjacent to the point of lowest suction pressure, and a second line means connected between the compressor motive means and the oil reservoir,
   (d) an oil separator disposed in the first line means to separate oil from the gaseous refrigerant therein,
   (e) flow inducing means in communication with the oil separator to induce the flow of collected oil therefrom for return to the oil reservoir.

3. An oil lubrication system for refrigeration apparatus which has a centrifugal compressor driven by a motive means, a condenser, an expansion device and an evaporator connected to each other in an operative refrigeration loop, said system comprising:
   (a) an oil reservoir having an upper portion and a lower portion,
   (b) an oil pump in communication with the lower portion of the oil reservoir for delivering oil lubricant to the compressor and motive means,
   (c) pressure equalization line means including a first line means connected between the motive means and the compressor adjacent to the point of lowest suction pressure, and a second line means connected between the motive means and the oil reservoir,
   (d) an oil separator disposed in the first line means to separate oil from the gaseous refrigerant therein,
   (e) a flow inducing means in communication with the oil separator to induce the flow of collected oil therefrom for return of the oil to the oil reservoir.

4. An oil lubrication system for refrigeration apparatus which has a centrifugal compressor driven by a motive means, condenser, expansion device and an evaporator, connected to each other in an operative refrigeration loop, said system comprising:
   (a) an oil reservoir having an upper portion and a lower portion,
   (b) an oil pump in communication with the oil reservoir for delivering oil lubricant to the motive means of the compressor,
   (c) an oil separator in communication with the upper portion of the oil reservoir and having a gaseous refrigerant portion and an oil collecting portion therein,
   (d) a first line means communicating the gaseous refrigerant upper portion of the oil separator to the compressor at the point of lowest suction pressure,
   (e) a flow inducing means in communication with the oil portion of the oil separator, and powered by motive oil from the oil pump to induce the flow of oil from the oil collecting portion of the oil separator,
   (f) a second line means connected between the motive means and the oil reservoir to vent the refrigerant gas and oil from the motive means to the oil reservoir.

5. The combination claimed in claim 4 wherein:
   (a) the oil reservoir disposed externally of the refrigeration apparatus.

6. An oil lubrication system for refrigeration apparatus which has a centrifugal compressor driven by a motive means, a condenser, an expansion device and evaporator, connected to each other in an operative refrigeration loop, said system comprising:
   (a) an oil reservoir having an upper portion and a lower portion therein,
   (b) an oil pump in communication with the lower portion of the oil reservoir for delivering oil lubricant to the compressor and motive means,
   (c) an oil separator in communication with the motive means and having a gaseous refrigerant portion and an oil collecting portion therein,
   (d) a first line means communicating the gaseous refrigerant portion of the oil separator to the compressor at the point of lowest suction pressure thereof,
   (e) a jet pump in communication with the oil collecting portion of the oil separator, and receiving motive oil from the oil pump to induce the flow of oil from the oil collecting portion of the oil separator,
   (f) a second line means connected between the motive means and the oil reservoir to vent the refrigerant gas and oil from the motive means to the oil reservoir.

7. The combination claimed in claim 6 wherein:
   (a) the motive means including an electric motor and a speed increasing gear connection.

8. A refrigeration system comprising:
   (a) a compressor having an impeller disposed between an inlet and an outlet therein,
   (b) a condenser,
   (c) an expansion device,
   (d) an evaporator,
   (e) refrigerant loop line means connecting the compressor inlet and outlet with the condenser, expansion device and the evaporator to form an operative refrigeration loop,
   (f) motive means connected to drive the compressor impeller,
   (g) a hermetic casing housing the compressor and the motive means,
   (h) an oil reservoir having an upper portion and a lower portion,
   (i) an oil pump in communication with the lower portion of the oil reservoir for delivering oil lubricant to the motive means,
   (j) pressure equalization line means connected between the oil reservoir, the compressor and the motive means to equalize the pressure in the oil reservoir whereby oil foaming therein is restricted, (k) oil separation means disposed in the pressure equalization line means to collect oil therein and prevent the flow of oil from the oil reservoir from entering the compressor, (l) a jet pump in communication with the oil separation means to induce the flow of collected oil therein by the flow of motive oil passing through the jet pump from the oil pump for return to the oil reservoir.

9. The combination claimed in claim 8 wherein:
(a) inlet guide vanes connected in the inlet of the compressor in spaced relationship to the impeller,
(b) one of the pressure equalization line means communicating with the compressor inlet and connected intermediate the inlet guide vanes and the impeller.

10. The combination claimed in claim 9 wherein:
(a) the pressure equalization line means including a first line means connected between the oil reservoir and the compressor intermediate the inlet guide vanes and the impeller, and a second line means communicating between the compressor motive means and the oil reservoir.

11. The combination claimed in claim 9 wherein:
(a) the pressure equalization line means including a first line means connected between the motive means and the compressor intermediate the inlet guide vanes and the impeller, and a second line means connected between the motive means and the oil reservoir,
(b) the oil separator disposed in the first line means.

References Cited by the Examiner

UNITED STATES PATENTS

| | | | |
|---|---|---|---|
| 3,149,478 | 9/1964 | Anderson | 62—469 |
| 3,163,999 | 1/1965 | Ditzler | 62—469 |
| 3,200,603 | 8/1965 | Wake | 62—193 X |

MEYER PERLIN, *Primary Examiner.*